UNITED STATES PATENT OFFICE.

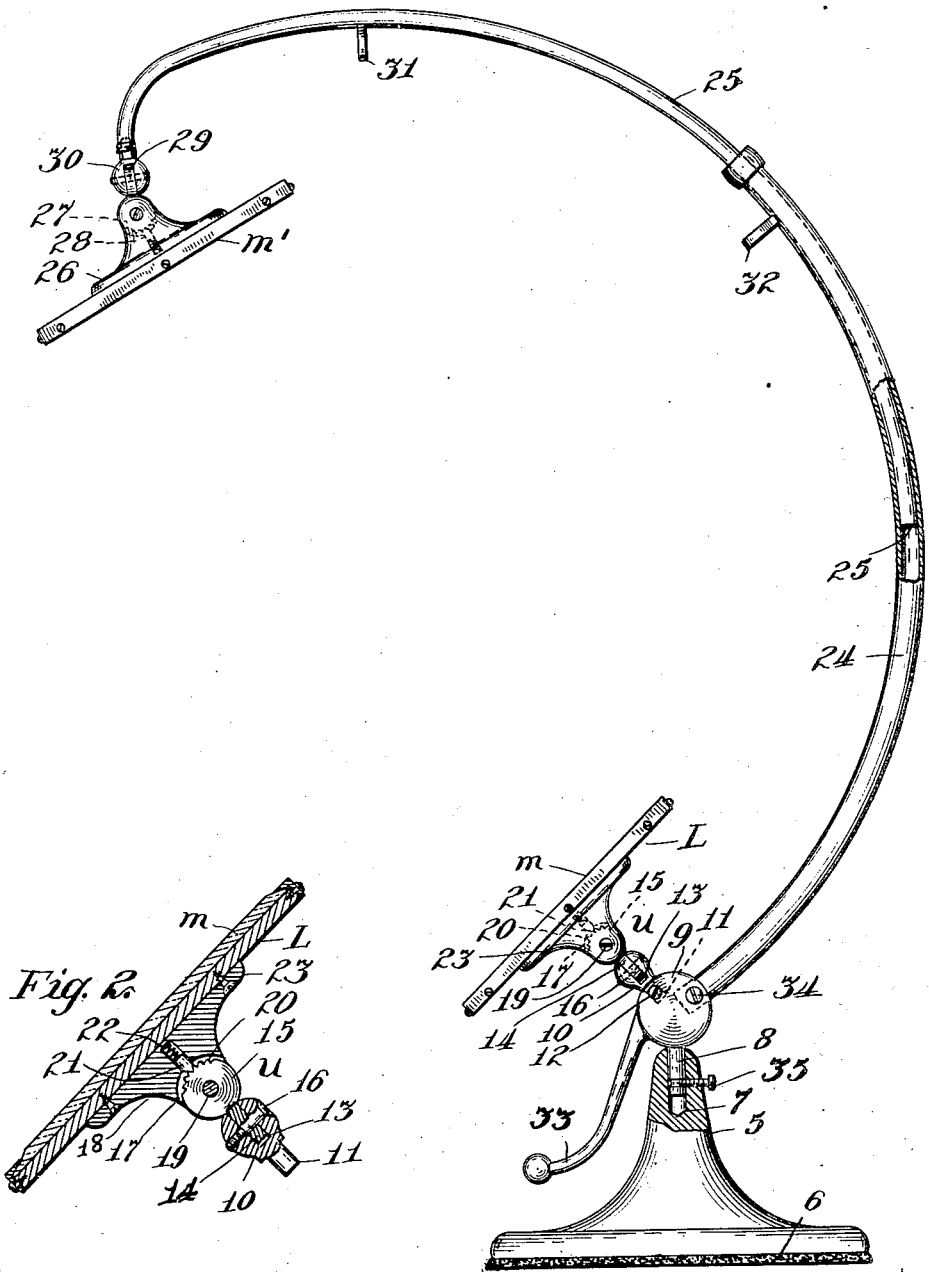

FREDERICK C. WINZENBURG, OF CHICAGO, ILLINOIS.

TOILET-MIRROR STRUCTURE.

1,050,321.

Specification of Letters Patent. Patented Jan. 14, 1913.

Application filed June 10, 1912. Serial No. 702,723.

*To all whom it may concern:*

Be it known that I, FREDERICK C. WINZENBURG, of Chicago, in the county of Cook and State of Illinois, have invented certain new and useful Improvements in Toilet-Mirror Structures, of which the following is a specification.

My invention relates to toilet mirror structures particularly useful for ladies' hair dressing to enable the top and back of the head to be seen as well as the face.

The object of the invention is to provide a light, portable stand for two mirrors which will enable independent universal adjustment of the mirrors and which will enable relative bodily adjustment of the mirrors, such adjustments to be accomplished without the use of set screws, clamping or other mechanism which require special manipulations.

In the accompanying drawings the various features of the invention are clearly illustrated, and Figure 1 is a side elevational view of the structure, and Fig. 2 is a sectional view showing the adjustment for the mirrors.

The supporting stand comprises a base 5 which may be in the form of a casting and shod with a disk 6 of felt or other cushioning material. The upper end of the base has a vertical pivot pocket 7 for receiving a pivot pin 8 extending downwardly from the supporting head 9. This head supports the lower mirror structure L comprising a mirror frame $m$ and universal adjusting mechanism $u$ for enabling the mirror to be adjusted at various angles. As shown, the mechanism $u$ comprises a ball 10 secured to the head 9 by means of the pin 11 extending into the head and secured by means of a set screw or pin 12. The ball has a diametral pivot slot 13 for receiving the circular pivot tongue 14 extending from a circular disk 15, a pin 16 holding the tongue in place. The disk 15 extends into a slot 17 in the supporting bracket 18 and is held in place by the pivot pin or screw 19. The periphery of the disk 15 has ratchet teeth 20 to be engaged by a pawl pin 21 held in engagement with the teeth by a compression spring 22 between the pin and the base of the slot 17. The mirror frame $m$ is secured to the base 23 of the bracket as indicated. With this arrangement the mirror frame $m$ may be swung laterally and vertically, it being held in lateral adjustment by the frictional engagement of the tongue 14 with the ball 10 and being held in vertical adjustment by the engagement of the pawl pin with the ratchet teeth.

Extending upwardly from the head 9 and preferably along the arc of a circle is a tubular arm 24 with which the extension rod 25 has frictional telescopic engagement, the end of the rod 25 supporting the upper mirror structure. The upper mirror structure is constructed in the same manner as the lower mirror structure, the frame $m'$ being secured to the bracket 26 which pivots the ratchet disk 27 and contains the pawl pin 28, and the tongue 29 extending from the disk having frictional pivotal engagement in the ball 30 secured to the end of the extension rod 25. The upper mirror is thus adaptable for vertical and horizontal adjustment or any combination thereof. By sliding the rod 25 into or out of the tube 24, the upper mirror structure can be adjusted bodily with reference to the lower mirror structure and such bodily adjustment together with the individual adjustment of the mirrors will enable any setting so that the top and back of the head and the face can be seen at the same time in various ways. To enable more ready adjustment of the rod 25 a handle 31 is secured thereto, and to the tube 24 a handle 32 is secured. To effect further adjustment of the mirror structure the handle 33 is provided on the head 9 and extends downwardly and forwardly to within a short distance of the periphery of the base 5. By moving the end of this handle laterally, the head is rotated on the pivot pin 8 to carry the mirror supporting structure into any desired position. The head 9 together with the pin 8 and handle 33 are preferably in the form of an integral casting, and the lower end of the tube 24 is secured to the head 9 by means of a set screw or pin 34. To prevent accidental removal of the head 9 from the base, the pin 8 may have a peripheral groove into which a locking screw 35 projects.

I thus provide a light yet substantial mirror structure which is of neat appearance and which will enable universal adjustment so that the two mirrors can be used to the best advantage, and for the various adjustments it is necessary only to move the various parts to the desired positions whereupon they will be automatically held in such positions without the necessity of turning screws or operating special clamping devices.

I do not, of course, desire to be limited to the exact details of construction shown, as changes are possible which would still come within the scope of my invention and I therefore claim the following:

1. In a toilet mirror structure, the combination of a base having a vertical pivot pocket at its upper end, a head having a downwardly extending pin pivotally engaging in said pocket, a lower mirror structure supported on said head, a tubular arm extending upwardly and forwardly from said head, a curved extension rod having frictional telescopic engagement with said arm, an upper mirror structure supported at the outer end of said rod, and a handle extending downwardly and forwardly from said head by means of which said head and structure mounted thereon may be rotated.

2. In a toilet mirror structure, the combination of a supporting base, a head pivoted to the upper end of said base, a pivot member secured to said head, a bracket having pivotal engagement with said pivot member, a mirror frame secured to said bracket, a tubular arm secured to and extending upwardly and forwardly from said head, an extension rod having frictional telescopic engagement in said arm, a pivot member secured to the outer end of said rod, a bracket having pivotal engagement with said pivot member, and an upper mirror frame secured to said bracket.

3. In a toilet mirror structure, the combination of a base having a vertical pivot pocket in its upper end, a head having a downwardly extending pivot pin engaging in said pocket, a pivot member secured to said head and having a pivot slot, a ratchet disk having a pivot tongue frictionally engaging in said slot and set at right angles with reference to said disk, a bracket having a slot in which said disk is pivoted, a pawl in said pocket and a spring for holding said pawl in engagement with the ratchet teeth of said disk, and a mirror frame secured to said bracket.

4. In a toilet mirror structure, the combination of a base having a vertical pivot pocket in its upper end, a head having a downwardly extending pivot pin engaging in said pocket, a pivot member secured to said head and having a pivot slot, a ratchet disk having a pivot tongue frictionally engaging in said slot and set at right angles with reference to said disk, a bracket having a slot in which said disk is pivoted, a pawl in said pocket, a spring for holding said pawl in engagement with the ratchet teeth of said disk, a mirror frame secured to said bracket, and a handle extending downwardly from said head for enabling said head to be turned on its pivot.

5. In a toilet mirror structure, the combination of a supporting base having a vertical pivot pocket at its upper end, a head having a pivot pin engaging in said pocket, a curved tubular arm extending upwardly from said head, an extension rod having frictional telescopic engagement with said arm, a lower mirror frame, universal hinge mechanism supporting said mirror frame on said head, an upper mirror frame, and universal hinge mechanism supporting said upper mirror frame from the outer end of said extension rod.

In witness whereof, I hereunto subscribe my name this 7th day of June, A. D. 1912.

FREDERICK C. WINZENBURG.

Witnesses:
CHARLES J. SCHMIDT,
JOYCE M. LUTZ.